United States Patent
Jochim et al.

(10) Patent No.: US 10,169,332 B2
(45) Date of Patent: Jan. 1, 2019

(54) DATA ANALYSIS FOR AUTOMATED COUPLING OF SIMULATION MODELS

(71) Applicant: International Business Machines Corporation, Armonk, NY (US)

(72) Inventors: Charles A. Jochim, Dublin (IE); Ying Liu, Round Rock, TX (US); Fearghal O'Donncha, Galway (IE); Campbell D. Watson, Brooklyn, NY (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 15/596,185

(22) Filed: May 16, 2017

(65) Prior Publication Data

US 2018/0336180 A1    Nov. 22, 2018

(51) Int. Cl.
G06F 17/27    (2006.01)
G06F 17/30    (2006.01)
G10L 15/18    (2013.01)

(52) U.S. Cl.
CPC ........ *G06F 17/2785* (2013.01); *G06F 17/271* (2013.01); *G06F 17/274* (2013.01); *G06F 17/277* (2013.01); *G06F 17/30294* (2013.01); *G10L 15/18* (2013.01)

(58) Field of Classification Search
None
See application file for complete search history.

(56) References Cited

U.S. PATENT DOCUMENTS

| | | | | |
|---|---|---|---|---|
| 5,363,320 | A | * 11/1994 | Boyle | G06F 17/5036 703/2 |
| 6,006,221 | A | * 12/1999 | Liddy | G06F 17/30011 |
| 6,823,297 | B2 | 11/2004 | Jenny et al. | |
| 6,915,254 | B1 | 7/2005 | Heinze et al. | |

(Continued)

FOREIGN PATENT DOCUMENTS

| | | |
|---|---|---|
| CN | 103019654 | 1/2015 |
| JP | 2005338996 | 12/2005 |

OTHER PUBLICATIONS

Helmig, et al., "Model coupling for multiphase flow in porous media," Advances in Water Resources, vol. 51, pp. 52-66, 2013.

(Continued)

*Primary Examiner* — Marcus T Riley
(74) *Attorney, Agent, or Firm* — ZIP Group PLLC

(57) ABSTRACT

A distributed computer system includes a distributed processor, a distributed memory, and a simulation engine (SE). The SE includes a simulation I/O coupler that links a first variable of a first simulation model I/O data structure to a second variable of a second simulation model I/O data structure. The SE includes a natural language processing system that extracts a first variable description associated with the first variable, determines similar character strings to the first variable description from an information corpus, and ranks the determined character strings based upon similarity to the first variable description. The SE links the first variable to the second variable if the rank of an equal character string to the second variable description is greater than a rank threshold. The SE may augment the simulation model I/O data structures by writing a value of the first variable to a value of the second variable, or visa versa.

20 Claims, 6 Drawing Sheets

(56) References Cited

U.S. PATENT DOCUMENTS

| | | |
|---|---|---|
| 8,930,247 B1 | 1/2015 | Zhang et al. |
| 2004/0034514 A1 | 2/2004 | Langemyr et al. |
| 2008/0059190 A1* | 3/2008 | Chu .................... G10L 13/06 704/258 |
| 2008/0071656 A1 | 3/2008 | Steuben et al. |
| 2010/0082142 A1* | 4/2010 | Usadi ................ G06F 17/5018 700/104 |

OTHER PUBLICATIONS

Larson et al., "The Model Coupling Toolkit: A new fortran90 toolkit for building multiphysics parallel coupled models," International Journal of High Performance Computing Applications, vol. 19, No. 3, pp. 277-292, 2005.

Bulatewicz, et al., "A domain specific language for model coupling," Proceedings of the 2006 Winter Simulation Conference, pp. 1091-1100, 2006.

Ford, et al., "A Flexible Unified Model Environment: Model Coupling Review," Manchester Information Ltd., The University of Manchester, Manchester, M13 9PL, UK 1 (2002).

Demner-Fushman, et al., "What Can Natural Language Processing Do For Clinical Decision Support?," Journal of biomedical informatics 42.5, pp. 760-772, 2009.

Pakhomov, et al., "High Throughput Modularized NLP System for Clinical Text," Proceedings of the ACL 2005 on Interactive poster and demonstration sessions. Association for Computational Linguistics, 2005.

Sobhana, et al., "Conditional Random Field Based Named Entity Recognition in Geological Text," International Journal of Computer Applications 1.3, pp. 143-147, 2010.

Chakraborty, et al., "Extraction of (Key, Value) Pairs from Unstructured Ads," AAAI Fall Symposium Serie. 2014.

Chevillon, et al., "FinFET Compact Modeling and Parameter Extraction," Mixed Design of Integrated Circuits & Systems, MIXDES—16th International Conference. IEEE, 2009.

Andersson, et al., "PyFMI A Python Package for Simulation of Coupled Dynamic Models With the Functional Mock-up Interface," Technical Report in Mathematical Sciences, 2016.

Valcke, et al., "Coupling technologies for Earth System Modelling," Geosci. Model Dev. Discuss., 2012.

* cited by examiner

DATA ANALYSIS FOR AUTOMATED COUPLING OF SIMULATION MODELS

FIELD OF THE INVENTION

Embodiments of the invention generally relate to computers and more particularly to a distributed computing system that analyzes and extracts information and data from pertinent input and output files in order to couple distinct simulation models to carry out a multi model simulation.

DESCRIPTION OF THE RELATED ART

Modeling and simulation refers to using models—physical, mathematical, or otherwise logical representation of a system, entity, phenomenon, or process to develop data as a basis for managerial decision making or technical understanding. Modeling and simulation can facilitate understanding a system's behavior without actually testing the system in the real world. For instance, to determine which type of spoiler would improve traction the most while designing a race car, a computer simulation of the car could be used to estimate the effect of different spoiler shapes on the coefficient of friction in a turn. Similarly, to determine the effect of a particular change in a region's climate, a climate model simulates the interactions between the change and other important drivers of climate, including atmosphere, oceans, land surface and ice.

To facilitate multidisciplinary scientific investigations, various distinct simulation models may be connected together. For example, a geoscience model and a material science model may be connected. Such connection may allow for a more sophisticated simulation of such physical phenomenon and interactions there between.

Traditionally, model connection may be achieved by merging model program instructions so that a concurrent simulation thereupon would impact each other. For example, a developer may modify source code of a first model to allow it to read-in and interpolate data-files from the other coupled model. In another known model connection solution, the developer may alter or pre-process a file that is to be transferred from the first model and utilized by the second model in order for that file to match the existing file structure or format of the second model. In another model connection solution, model coupler program instructions are developed "ad-hoc" for each model coupling exercise and traditionally require configuration of model source code. The model coupler may accommodate translations between data types, grids and sometimes languages between the coupled models.

SUMMARY

In an embodiment of the present invention, a method of linking variables within disparate simulation models is presented. The method includes extracting, with a distributed processor, a first variable description associated with a first variable within a simulation input data structure that is to be operated upon by a first simulation model. The method further includes extracting, with the distributed processor, a plurality of variable descriptions within a simulation output data structure that has been operated upon by a second simulation model. The method further includes determining, with the distributed processor, character strings within an information corpus that are similar to the first variable description. The method further includes ranking, with the distributed processor, the character strings in order of confidence levels. Each confidence level indicates the degree of similarity between an associated character string and the first variable description. The method further includes determining, with the distributed processor, a particular variable description of the plurality of variable descriptions within the simulation output data structure is equal to a character string. The particular variable description is associated with a second variable. The method further includes linking, with the distributed processor, the first variable to the second variable if the rank of the equal character string is greater than a confidence level threshold.

In another embodiment of the present invention, a computer program product for linking variables within disparate simulation models is presented. The computer program product includes a distributed computer readable storage medium having program instructions embodied therewith and are readable by a distributed processor to cause the distributed processor to extract a first variable description associated with a first variable within a simulation input data structure that is to be operated upon by a first simulation model, extract a plurality of variable descriptions within simulation output data structure that has been operated upon by a second simulation model, determine character strings within an information corpus that are similar to the first variable description, rank the character strings in order of confidence levels, wherein each confidence level indicates the degree of similarity between an associated character string and the first variable description, determine a particular variable description of the plurality of variable descriptions within the simulation output data structure is equal to a character string, wherein the particular variable description is associated with a second variable, and link the first variable to the second variable if the rank of the equal character string is greater than a confidence level threshold.

In yet another embodiment of the present invention, a distributed computer system includes a distributed processor and a distributed memory communicatively coupled to the distributed processor. The distributed memory is encoded with instructions that when executed by the distributed processor cause the distributed processor to extract a first variable description associated with a first variable within a simulation input data structure that is to be operated upon by a first simulation model, extract a plurality of variable descriptions within simulation output data structure that has been operated upon by a second simulation model, determine character strings within an information corpus that are similar to the first variable description, rank the character strings in order of confidence levels, wherein each confidence level indicates the degree of similarity between an associated character string and the first variable description, determine a particular variable description of the plurality of variable descriptions within the simulation output data structure is equal to a character string, wherein the particular variable description is associated with a second variable, and link the first variable to the second variable if the rank of the equal character string is greater than a confidence level threshold.

These and other embodiments, features, aspects, and advantages will become better understood with reference to the following description, appended claims, and accompanying drawings.

It is to be noted, however, that the appended drawings illustrate only example embodiments of the invention, and are therefore not considered a limitation of the scope of embodiments of the invention.

DETAILED DESCRIPTION

Embodiments relate to a distributed computer system that includes a distributed processor, a distributed memory, and a simulation engine. The simulation engine includes a simulation I/O coupler that maps a first variable from a first simulation model input output (I/O) data structure to a second variable from a second simulation model I/O data structure. An I/O data structure is a data structure, such as an I/O file, that includes simulation model input data that is read and operated upon by a simulation model or is a data structure that includes simulation model output data that has been operated upon and written by a simulation model.

The simulation engine includes a natural language processing system that extracts a first variable description associated with the first variable, determines similar character strings to the first variable description from within an information corpus, and ranks the determined character strings based upon similarity to the first variable description. The simulation engine compares various variable descriptions within the second simulation model I/O data structure to the ranked character strings to determine if any of the ranked character strings equal, or are the same as, any of the various variable descriptions within the second simulation model I/O data structure. The simulation engine then links the first variable to the second variable if the rank or similarity of an equal character string to the second variable description associated with the second variable is greater than a minimum rank or similarity threshold.

Subsequently, the simulation engine may augment the first simulation model I/O data structure of by changing a value of the first variable to a value of the second variable and utilize the augmented simulation I/O data structure to perform a connected simulation. As such, according to the various embodiments, the simulation engine may analyze variable descriptions within disparate simulation model I/O data structures and link values associated with the variable descriptions and resultantly couple the disparate simulation models.

Figure 1:
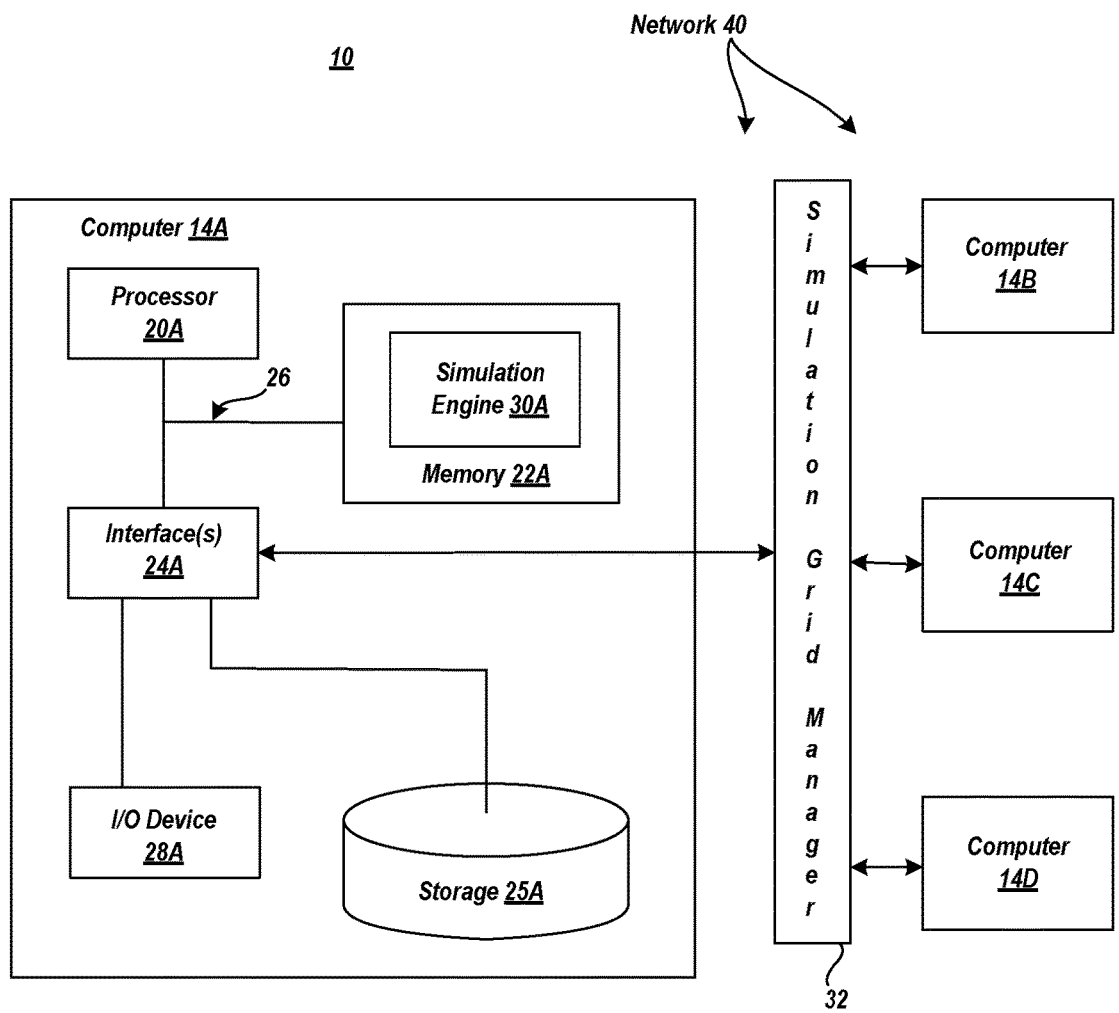
FIG. 1 illustrates a high-level block diagram of an exemplary distributed computer system for implementing various embodiments of the invention.

Referring to the Drawings, wherein like numbers denote like parts throughout the several views, FIG. 1 depicts a high-level block diagram representation of a distributed computer system 10, according to an embodiment of the present invention. System 10 includes numerous computers 14A-14D that are communicatively connected by network 40. Though four computers are depicted, it is contemplated that fewer or greater number of computers may be utilized by system 10. The term "computer" is used herein for convenience only, and in various embodiments is a more general data handling system, such as a personal computer, tablet, server computer, or the like. The mechanisms and apparatus of embodiments of the present invention apply equally to any appropriate distributed data handling system.

Each computer 14B-14D may include the same components, fewer components, or additional components as that are depicted within computer 14A. For example, computer 14B may include processor 20B, memory 22B, interface(s) 24B, bus 26B, I/O device(s) 28B, and storage device(s) 25B; computer 14C may include processor 20C, memory 22C, interface(s) 24C, bus 26C, I/O device(s) 28C, and storage device(s) 25C; and computer 14D may include processor 20D, memory 22D, interface(s) 24D, bus 26D, I/O device(s) 28D, and storage device(s) 25D.

The major components of computer 14A may comprise one or more processors 20A, system memory 22A, and one or more interfaces 24A, all of which are communicatively coupled, directly or indirectly, for inter-component communication via one or more busses, such as memory bus 26, or the like.

The computer 14A contains one or more general-purpose programmable central processing units (CPUs), herein generically referred to as processor 20A. In embodiments, the computer 100 contains multiple processors 20A typical of a relatively large system such as a server computer. Each processor 20A executes instructions stored in the system memory 22A and may comprise one or more levels of on-board cache.

The system memory 22A may comprise a random-access semiconductor memory, storage device, or storage medium for storing or encoding data and program instructions. The system memory 22A may be, conceptually, a single monolithic entity, but in other embodiments the system memory 22A is a more complex arrangement, such as a hierarchy of caches and other memory devices. For example, memory 22A may exist in multiple levels of caches, and these caches may be further divided by function, so that one cache holds instructions while another holds non-instruction data, which is used by the processor 20A. The system memory 22A stores or encodes an operating system (not shown), and one or more applications, such as simulation engine 30A.

The memory bus 26A provides a data communication path for transferring data amongst the processor 20A, the system memory 22A, and the interface(s) 24A. One interface may be an input/output (I/O) interface that communicates to I/O processors (IOPs) or I/O adapters (IOAs). The IOPs support communication with a variety of storage and I/O devices. For example, IOPs supports the attachment of one or more I/O device 28A, which may comprise user output devices (such as a video display device, speaker, etc.) and user input devices (such as touchpad, buttons, etc.).

Another interface may be a storage interface that communicates with one or more disk drives or storage devices 25A. In an embodiment, the storage devices 25A are disk drive storage device(s), flash storage device(s), etc. and in embodiments the multiple devices are configured to appear as a single large storage device 25A. The contents of the system memory 22A, or any portion thereof, may be stored to and retrieved from the storage devices 25A, as needed. The storage devices 25A generally have a slower access time than does the memory 22A, meaning that the time needed to read and/or write data from/to the memory 22A is less than the time needed to read and/or write data from/to for the storage devices 25A.

Another interface may be a network interface to provide one or more communications paths from the computer 14A to other data handling devices such as other computers (e.g., computer 14B-14D); such paths may be comprised within, e.g., one or more networks 40.

Although the memory bus 26A is shown in FIG. 1 as a relatively simple, single bus structure providing a direct communication path among the processor 20A, the system memory 22A, and the interface(s) 24A, in fact the memory bus 26A may comprise multiple different buses or communication paths, which may be arranged in any of various forms, such as point-to-point links in hierarchical, star or web configurations, multiple hierarchical buses, parallel and redundant paths, or any other appropriate type of configuration.

The network 40 may be any suitable network or combination of networks and may support any appropriate protocol suitable for communication of data to/from the computer 14A. In various embodiments, the network 40 may represent a data handling device or a combination of data handling devices, either connected directly or indirectly to the computer 100. In another embodiment, the network 40 may support wireless communications. In another embodiment, the network 40 may support hard-wired communications, such as a telephone line or cable. In another embodiment, the network 40 may be the Internet and may support IP (Internet Protocol). In another embodiment, the network 40 is implemented as a local area network (LAN) or a wide area network (WAN). In another embodiment, the network 40 is implemented as a hotspot service provider network. In another embodiment, the network 40 is implemented an intranet. In another embodiment, the network 40 is implemented as any appropriate cellular data network, cell-based radio network technology, or wireless network. In another embodiment, the network 40 is implemented as any suitable network or combination of networks. Although one network 40 is shown, in other embodiments any number of networks 40 (of the same or different types) may be present.

The processor 20A may include a graphics processor unit (GPU) that builds images (e.g. a GUI) for output to I/O device 28A, such as a display screen, touch screen display, or the like. The GPU, working in conjunction with one or more applications, may determines how to manipulate pixels of the display to create an image, such as a graphical user interface.

The computers 14A-14D within distributed system 10 communicate and coordinate their actions by passing messages and may interact with each other in order to achieve a common goal. In system 10, a simulation model may be run by separating the simulation model into simulation model tasks, each of which is solved by one or more computers 14A-14D and relevant information is communicated by message passing therebetween. The separation and distribution of such tasks and the routing of messages between computers 14A-14D is managed by simulation grid manager 32.

In an embodiment, simulation grid manager 32 is an application stored entirely in system memory of a single computer. For example, simulation grid manager 32 is an application stored entirely within system memory of e.g., a managing computer that manages the computers 14A-14D, one particular computer of computers 14A-14D, or the like. As such, the program instructions of simulation grid manager 32 may be executed by a single particular processor (i.e. processor of managing computer, 20A, 20B, 20C, or 20D). In another embodiment, simulation grid manager 32 is an application distributed across respective system memories of various computers. For example, simulation grid manager 32 is an application stored across different system memories of e.g., a managing computer that manages the computers 14A-14D and two particular computer of computers 14A-14D, or the like. As such, the program instructions of simulation grid manager 32 may be executed by multiple particular processors (i.e. processor of managing computer, 20A, 20B, 20C, and/or 20D).

In an embodiment, particular hardware resources such as system memory 22A-22D, processor 20A-20D, and/or storage 25A-25D within respective computers 14A-14D may be distributed by simulation grid manager 32. Various hardware distribution and management schemes are known in the art. When system memory 22A-22D, processor 20A-20D, and/or storage 25A-25D are distributed by simulation grid manager 32, the distributed collective system memory 22A-22D is referred to herein as distributed memory 22, the distributed collective processor 20A-20D is referred to herein as distributed processor 20, and the distributed collective storage 25A-25D is referred to herein as distributed storage 25. Therefore, the distributed processor 20 may include two or more of the processors 20A-20D, the distributed memory 22 may include two or more of the memories 22A-22D, and the distributed storage 25 may include two or more of the storage devices 25A-25D.

Similarly, in an embodiment particular software resources such as simulation engine 30A-30D within respective computers 14A-14D may be distributed by simulation grid manager 32. Various software distribution and management schemes are known in the art. When simulation engine 30A-30D are distributed by simulation grid manager 32, the distributed collective simulation engine 30A-30D is referred to herein as simulation engine 30. In other words, some or all of simulation engine 30 may be stored within a different computer 14A-14D and may be accessed remotely, e.g., via simulation grid manager 32 and network 40.

The simulation grid manager 32 may use virtual addressing mechanisms that allow the operating system(s), application(s), simulation engines 30A-30D, or the like to behave as if they only have access to a large, single storage (e.g. distributed memory 22, distributed storage 25, or the like) instead of access to multiple, smaller storage entities (e.g., memory 22A, storage 25C, or the like).

In an embodiment, operating system(s), application(s), simulation engine 30, and/or simulation grid manager 32 each comprise program instructions or statements that execute on the distributed processor 20 to carry out the functions as further described below. When such program instructions executed by the distributed processor 20, such distributed computer system 10 becomes a particular computing system that is configured to carry out such instructions.

FIG. 1 is intended to depict the representative major components of the system 10. The individual components may have greater complexity than represented in FIG. 1, components other than or in addition to those shown in FIG.

1 may be present, and the number, type, and configuration of such components may vary. Several particular examples of such additional complexity or additional variations are disclosed herein; these are by way of example only and are not necessarily the only such variations. The various program instructions implementing e.g. upon system 10 according to various embodiments of the invention may be implemented in a number of manners, including using various computer applications, routines, components, programs, objects, models, data structures, etc.

The present invention may be a system, a method, and/or a computer program product at any possible technical detail level of integration. The computer program product may include one or more computer readable storage mediums (or media) having computer readable program instructions thereon for causing a distributed processor to carry out aspects of the present invention.

Each computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a model, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

Figure 2:
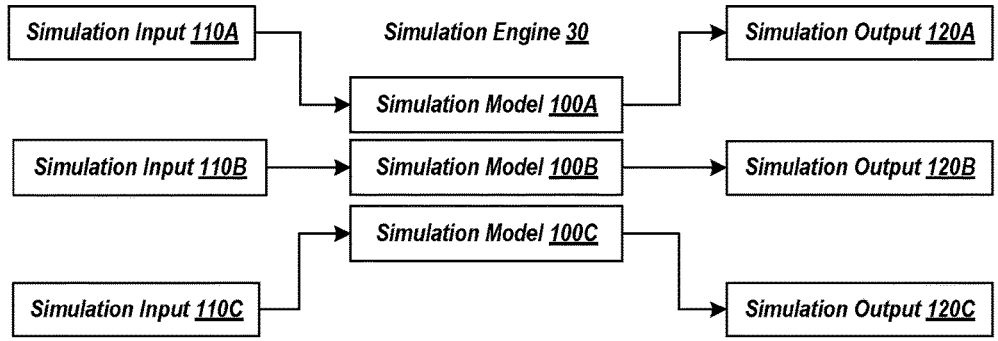
FIG. 2 illustrates a high-level block diagram of simulation models, according to various embodiments of the invention.

FIG. 2 illustrates a high-level block diagram of simulation models 100A, 100B, and 100C within simulation engine 30, according to various embodiments of the invention. Simulation models 100A, 100B, and 100C are distinct simulation program instructions that when evoked by distributed processor 20 logically represent a physical a system, entity, phenomenon, or process. For example, simulation model 100A may be a meteorology simulation model, simulation model 100B may be an oceanography simulation model, or the like. Simulation models 100A, 100B, and 100C may be stored within distributed memory 22 and/or distributed storage 25 within system 10.

Each simulation model 100A, 100B, and 100C reads in a respective simulation input 110A, 110B, and 110C data structure that each contain a plurality of input variables each input variable associated with a particular value. For example, a simulation input 110A data structure for the meteorology simulation model may include input variables such as, air temperature, wind velocity, air pressure, and the like. Likewise, a simulation input 110B data structure for the oceanography simulation model may include input variables such as, water temperature, salt concentration, water depth, and the like. Further, each simulation input 110A, 110B, and 110C data structure includes an associated value for each input variable. For example, simulation input 110A data structure for the meteorology simulation model may include a value for each input variable, such as 25° C. for the air temperature input variable, 10 knots for the wind velocity input variable, and 101,000 Pascals for the air pressure input variable. Likewise, simulation input 110B data structure for the oceanography simulation model may include a value for each input variable, such as 25° C. for the water temperature input variable, 35 gram/liter for the salinity input variable, and 89 meters for the water depth input variable. In an embodiment, the particular value for each input variable within a particular simulation input 110A, 110B, and 110C data structure may be chosen by a user via a particular I/O device of a computer 14A-14D within system 10. In another embodiment, the particular values for each input variable within a particular simulation input 110A, 110B, and 110C data structure may be set as default values by simulation engine 30. In another embodiment, some of the particular values for each input variable within a particular simulation input 110A, 110B, and 110C data structure may be set as default values by simulation engine 30 and some of the particular values for each input variable within a particular simulation input 110A, 110B, and 110C data structure may be chosen by the user via a particular I/O device of a computer 14A-14D within system 10.

The particular type or structure of simulation input 110A, 110B, and 110C data structures may be formatted or organized per the specifications or requirements of the associated simulation model 100A, 100B, and 100C. Simulation input 110A, 110B, and 110C data structures may be stored within distributed memory 22 and/or distributed storage 25 within system 10.

Subsequent to operating upon one or more of the variables within simulation input 110A, 110B, and 110C data structures, the respective simulation models 100A, 100B, and 100C outputs or writes a respective simulation output 120A, 120B, and 120C data structure that each contains a plurality of output variables each output variable associated with a particular value. Generally, an output variable is the same as a particular input variable, however, the value for the output variable may not necessarily be the same as the value for the associated input variable.

For example, a simulation output 120A data structure for the meteorology simulation model may include associated output variables such as, air temperature, wind velocity, air pressure, and the like. Likewise, a simulation output 120B data structure for the oceanography simulation model may include output variables such as, water temperature, salt concentration, water depth, and the like. Further, each simulation output 120A, 120B, and 120C data structure includes an associated value for each output variable. For example, simulation output 120A data structure for the meteorology simulation model may include a value for each output variable, such as 50° C. for the air temperature output variable, 19 knots for the wind velocity output variable, and 102,000 Pascals for the air pressure output variable. Likewise, simulation output 120B data structure for the oceanography simulation model may include a value for each output variable, such as 30° C. for the water temperature output variable, 39 gram/liter for the salinity output variable, and 140 meters for the water depth output variable. In an embodiment, the particular value for each output variable within a particular simulation output 120A, 120B, and 120C data structure is determined by the execution of program instructions by distributed processor 20 of the respective simulation model 100A, 100B, or 100C such that the respective simulation model operates upon the value of the associated input variable to generate the value of the output variable.

Figure 3:
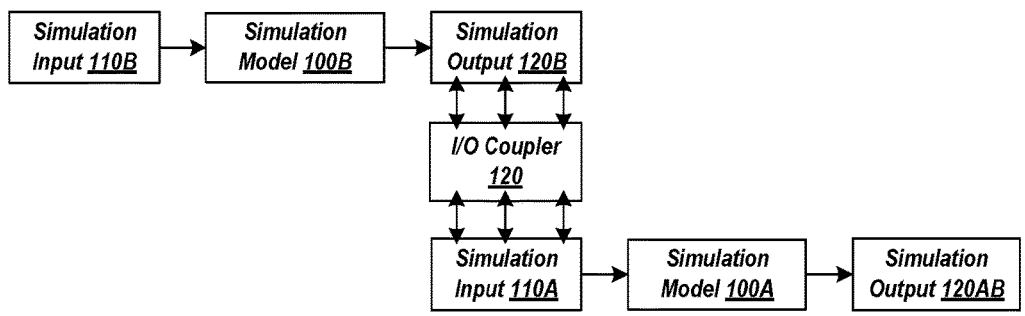
FIG. 3 illustrates a high-level block diagram model input/output (I/O) coupler that maps a variable from a first simulation I/O data structure to a variable from a second simulation I/O data structure, according to various embodiments of the invention.

FIG. 3 illustrates a high-level block diagram of model input/output (I/O) coupler 120 that maps a variable from a first simulation I/O data structure to a variable from a second simulation I/O data structure, according to various embodiments of the invention. The model I/O coupler 120 maps an input variable from a simulation input data structure to an output variable from a simulation output data structure, or visa versa. In a particular embodiment, as is depicted in FIG. 3, model I/O coupler 120 maps an output variable from simulation output 120B data structure to an input variable from simulation input 110A data structure.

The model I/O coupler 120 may be utilized to connect two or more simulation models 100A, 100B, and/or 100C. Model I/O coupler 120 connects two or more simulation models by augmenting a particular simulation input data structure associated with the second model with the values of mapped variables of a particular simulation output data structure associated with the first model. The augmented simulation input file is read by the second model and a connected simulation output data structure is generated and written by the second model.

As depicted in FIG. 3, model I/O coupler 120 is utilized to connect simulation model 100A and simulation model 100B. Initially, model 100B reads simulation input 110B data structure that includes a value for each input variable, operates upon one or more of the values within the simulation input 110B data structure (i.e. simulation 100B is performed), and writes simulation output 120B data structure that includes a value for each output variable. The model I/O coupler 120 creates an augmented simulation input 110A' data structure by writing the value for each output variable within the simulation output 120B data structure as the value of a mapped or linked input variable within the augmented simulation input 110A' data structure. Subsequently, the model 100A reads the augmented simulation input 110A' data structure that includes the mapped value for each input variable, operates upon one or more of the mapped values within the simulation input 110A' data structure (i.e. simulation 100A is performed), and writes a connected simulation output 120AB data structure that includes a value for each output variable.

The term augmented simulation input data structure is utilized herein to mean a simulation input data structure where the input variable values are designated by the value of a linked output variable of a simulation output data structure. The term connected simulation output data structure is utilized herein to mean a simulation output data structure in which the output variable values are designated by two or more simulation models.

Figure 4:
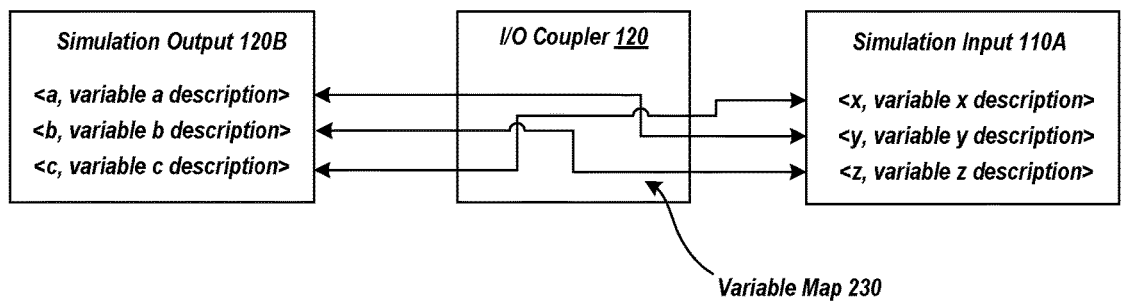
FIG. 4 illustrates a variable map that associates a variable from a first simulation I/O data structure to a variable from a second simulation I/O data structure, according to various embodiments of the invention.

FIG. 4 illustrates a variable map 230 that associates a variable from a first simulation I/O data structure to a variable from a second simulation I/O data structure, according to various embodiments of the invention. The variable map 230 links at least one input variable from a simulation input data structure to an output variable from a simulation output data structure, or visa versa. In a particular embodiment, as is depicted in FIG. 4, variable map 230 links an output variable "a" from simulation output 120B data structure to input variable "y" from simulation input 110A data structure, links an output variable "b" from simulation output 120B data structure to input variable "z" from simulation input 110A data structure, and links an output variable "b" from simulation output 120B data structure to input variable "x" from simulation input 110A data structure.

Map 230 is generally a data structure that links a variable within a particular I/O data structure to another variable within a distinct I/O data structure. In various embodiments, map 230 may be a data table, set of data pointers, set of meta-data, or the like.

In embodiments, each simulation I/O data structure, such as simulation output 120B data structure and simulation input 110A, further includes a variable description associated with a particular variable. For example, a simulation input 110A data structure for the meteorology simulation model may include numerous input variable descriptions such as, air temperature, wind velocity, air pressure, and the like. Likewise, a simulation output 120B data structure for the oceanography simulation model may include numerous output variables such as, water temperature, salt concentration, water depth, and the like. In some of these embodiments, one or more of such variable description(s) are written in human-readable characters within the respective simulation I/O data structure(s). In some embodiments, as are shown in FIG. 4, the value of the variable and the variable description are configured within the simulation I/O data structure as a linked data pair. In these embodiments, the variable map 230 links a first linked data pair in a first simulation I/O data structure to a second linked data pair in a second simulation I/O data structure.

Figure 5:
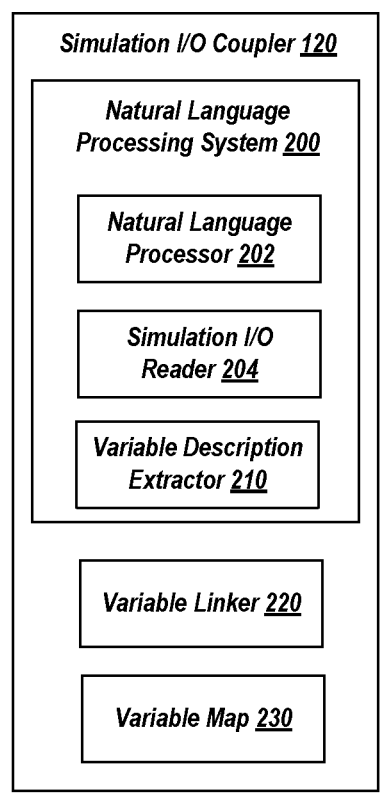
FIG. 5 illustrates a block diagram of an exemplary simulation input/output (I/O) coupler, according to various embodiments of the invention.

FIG. 5 illustrates a block diagram of an exemplary simulation input/output (I/O) coupler 120 within simulation engine 30, according to various embodiments of the invention. Coupler 120 may further include a natural language processing system 200 and variable linker 230. The natural language processing system 200 may include a natural language processor 202, a simulation I/O data structure reader 204, and a variable description extractor 210. The natural language processor 202 may include numerous sub-components, such as a tokenizer, a part-of-speech (POS) tagger, a semantic relationship identifier, a syntactic relationship identifier, and a relationship ranker. An exemplary natural language processor 202 is discussed in more detail in reference to FIG. 6.

The simulation I/O data structure reader 204 reads simulation I/O data structures and the variable description extractor 210 locates, finds, identifies, extracts or otherwise determines one or more variable descriptions within the simulation I/O data structure read by I/O data structure reader 204.

In embodiments, the variable linker 220 determines whether a first variable description in a first simulation I/O data structure read by I/O data structure reader 204 is the same or is adequately similar to a second variable description in a second simulation I/O data structure read by I/O data structure reader 204, and if the first variable description is the same or is adequately similar to the second variable description, the variable linker 220 modifies variable map 230 to link the variable associated with the first variable description with the variable associated with the second variable description.

While FIG. 5 illustrates a distributed simulation engine 30 with coupler 120 including the natural language processing system 200, variable linker 220, and variable map 230, there are suitable other distributed systems 10 where the natural language processing system 200 is in a distinct computer relative to variable linker 220 and variable map 230. For example, some embodiments may include two computers. The two computers may be communicatively coupled using any suitable communications connection (e.g., network 10, a wired connection, or the like). As is exemplary shown in FIG. 6, the first computer may include natural language processing system 200 configured to ingest and analyze simulation I/O data structures and the second computer may include variable linker 220, variable map 230, or the like.

Figure 6:
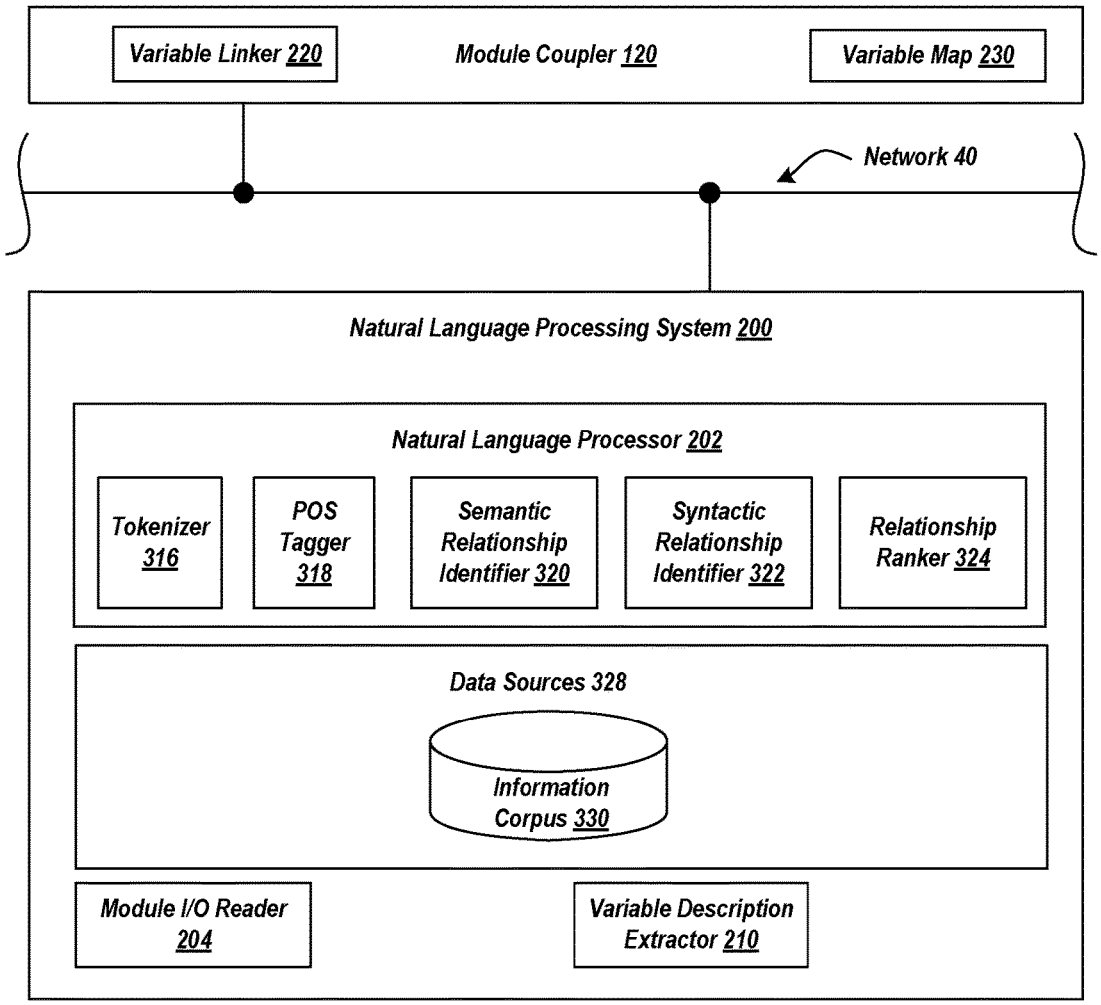
FIG. 6 illustrates a block diagram of an exemplary simulation input/output (I/O) coupler and of an exemplary natural language processing system, according to various embodiments of the invention.

FIG. 6 illustrates a block diagram of an exemplary simulation I/O coupler 120 and of an exemplary natural language processing system 200, according to various embodiments of the invention.

Natural language processing system 200 is configured to analyze a variable description against words and/or phrases within an information corpus 330. The term words and/or phrases within the information corpus 330 is herein defined as a character strings. In some embodiments, a remote computer may submit a simulation I/O data structure (containing one or more variable descriptions to be analyzed) to the natural language processing system 200 which may be housed on the same or different computer.

Consistent with various embodiments, the natural language processing system 200 may respond to simulation I/O data structure submissions. Specifically, the natural language processing system 200 may analyze extracted variable description data against the character strings within information corpus 330. In some embodiments, the natural language processing system 200 may include a natural language processor 202 and data sources 328.

The natural language processor 202 may be program instructions evoked by a particular processor 20A-20D or distributed processor 20 that analyzes extracted variable descriptions within read or received simulation I/O data structures. The natural language processor 202 may perform various analytic methods and techniques for analyzing variable descriptions (e.g., syntactic analysis, semantic analysis, etc.). The natural language processor 202 may be configured to recognize and analyze any number of natural languages. In some embodiments, the variable description extractor 210 may parse simulation I/O data structures to determine variable descriptions. Further, the natural language processor 202 may include various models to perform analyses of variable descriptions. These models may include, but are not limited to, a tokenizer 316, a part-of-speech (POS) tagger 318, a semantic relationship identifier 320, a syntactic relationship identifier 322, and relationship ranker 324.

In some embodiments, the tokenizer 316 may be program instructions evoked by a particular processor 20A-20D or distributed processor 20 that performs lexical analysis. The tokenizer 316 may convert a sequence of characters into a sequence of tokens. A token may be a string of characters of the variable description within the simulation I/O data structure and categorized as a meaningful symbol. Further, in some embodiments, the tokenizer 316 may identify word boundaries in the variable description and break any text passages within the variable description into their component text elements, such as words, multiword tokens, numbers, and punctuation marks. In some embodiments, the tokenizer 316 may receive a string of characters, identify the lexemes in the string, and categorize them into tokens.

Consistent with various embodiments, the POS tagger 318 may be program instructions evoked by a particular processor 20A-20D or distributed processor 20 that marks up a word in the variable description to correspond to a particular part of speech. The POS tagger 318 may read the variable description in natural language and assign a part of speech to each word or other token. The POS tagger 318 may determine the part of speech to which a word (or other text element) corresponds based on the definition of the word and the context of the word. The context of a word may be based on its relationship with adjacent and related words in a phrase, sentence, or paragraph. In some embodiments, the context of a word may be dependent on one or more previously analyzed simulation I/O data structures (e.g., the content of one simulation I/O data structure may shed light on the meaning of text elements in another simulation I/O data structure, particularly if they are associated with the same or highly similar simulation subject). Examples of parts of speech that may be assigned to words include, but are not limited to, nouns, verbs, adjectives, adverbs, and the like. Examples of other part of speech categories that POS tagger 318 may assign include, but are not limited to, comparative or superlative adverbs, wh-adverbs, conjunctions, determiners, negative particles, possessive markers, prepositions, wh-pronouns, and the like. In some embodiments, the POS tagger 318 may tag or otherwise annotate tokens of a variable description with part of speech categories. In some embodiments, the POS tagger 318 may tag tokens or words of a variable description to be parsed by other components of the natural language processing system 200.

In some embodiments, the semantic relationship identifier 320 may be program instructions evoked by a particular processor 20A-20D or distributed processor 20 that identifies semantic relationships of recognized text elements (e.g., words, phrases) in the variable description. In some embodiments, the semantic relationship identifier 320 may further determine functional similarities between entities in the variable description and the character string within the information corpus 330.

Consistent with various embodiments, the syntactic relationship identifier 322 may be program instructions evoked by a particular processor 20A-20D or distributed processor 20 that identifies syntactic relationships in the variable description. The syntactic relationship identifier 322 may determine the grammatical structure of the variable description such as, for example, which groups of words are associated as phrases and which word is the subject or object of a verb. The syntactic relationship identifier 322 may conform to formal grammar. In some embodiments, the syntactic relationship identifier 322 may further determine functional similarities between entities in the variable description and character strings within the information corpus 330.

Consistent with various embodiments, the relationship ranker 324 may be program instructions evoked by a particular processor 20A-20D or distributed processor 20 that gauges and ranks the degree of similarity between the variable description and character strings within information corpus 330. Various tools and algorithms may be used the relationship ranker 324 as are known to those skilled in the art (e.g., Naïve Bayes lexical model, etc.). In some embodiments, the relationship ranker 324 may include a sentiment ranker model 430. The relationship ranker 324 may rank the character strings within information corpus 330 by the degree of similarity of those character strings to the analyzed variable description.

In some embodiments, the relationship ranker 324 may generate a ranking data structure that includes the ranked character strings that are similar to the analyzed first variable description. This ranking data structure may be read by variable linker 220 to determine whether a character string from the information corpus 330 is adequately similar to the to-be potentially linked second variable associated with the second variable description. If a ranking of the most similar character string from information corpus 330 to the second variable description is above a ranking threshold, the variable linker 220 links the first variable associated with the first variable description that was utilized to generate the ranked character string list with the second variable associated with the second variable description that is most similar to the character string that is above the ranking threshold. As indicated above, variable linker 220 links the first variable with the second variable by modifying the map 230 to associate the first variable with the second variable.

In embodiments, the variable linker 220 may evoke natural language processor 202 to determine which character string within information corpus 330 is most similar to the second variable description. For example, the variable linker 220 may evoke tokenizer 316, POS tagger 318, semantic relationship identifier 320, and/or syntactic relationship identifier 322 to identify which ranked character string is the most similar to the second variable description.

In some embodiments, the variable description extractor 210 may be program instructions evoked by a particular processor 20A-20D or distributed processor 20 that parses a simulation I/O data structure and generates a corresponding parsed extracted-variable description data structure. For example, in response to receiving a simulation I/O data structure, the variable description extractor 210 may output parsed variable descriptions from the simulation I/O data structure. In some embodiments, a parsed variable description may be represented in the form of a parse tree or other graph structure.

In some embodiments, natural language processing system 200 includes information corpus 330 in one or more data sources 328. In some embodiments, data sources 328 may include simulation model data warehouses, simulation model information corpora, simulation data models, and simulation model document repositories. The information corpus 330 may enable data storage and retrieval. In some embodiments, the information corpus 330 houses a standardized, consistent, clean, and integrated copy of known definitions and descriptions of variables utilized by simulation models. Data stored in the information corpus 330 may be structured in a way to specifically address analytic requirements. For example, the information corpus 330 may store the simulation model variable information based on groups of related simulation models (e.g., simulation models that simulate similar phenomena, or the like) in order to make analyzing a variable description against the information corpus 330 more efficient. In some embodiments, the information corpus 330 may be information within a relational database.

Figure 7:
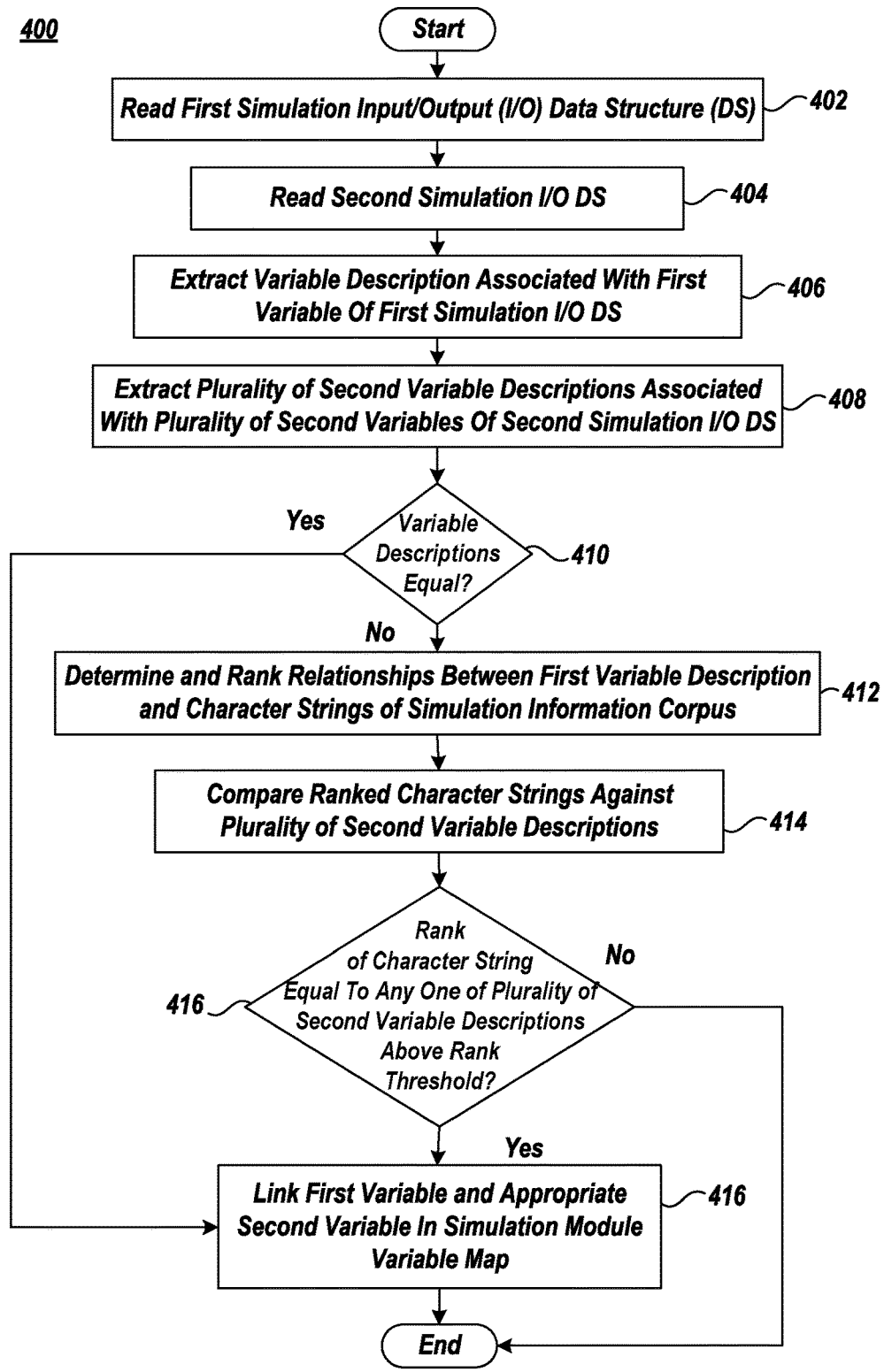
FIG. 7 illustrates an exemplary method of linking a variable from a first simulation I/O data structure to a variable from a second simulation I/O data structure, according to various embodiments of the present invention.

FIG. 7 illustrates an exemplary method 400 of linking a variable from a first simulation I/O data structure to a variable from a second simulation I/O data structure, according to various embodiments of the present invention. Method 400 begins by simulation I/O reader 204 reading a first simulation I/O data structure (block 402) and reading a second simulation I/O data structure (block 404). The first simulation I/O data structure, such as a simulation input 110 data structure, includes one or more variables and the second simulation I/O data structure, such as a simulation output 120 data structure, includes a plurality of variables. The first simulation I/O data structure further includes a variable description associated with each variable and the second simulation I/O data structure further includes a variable description associated with each variable.

The first simulation I/O data structure and the second simulation I/O data structure may be associated with a first simulation model and a second simulation model, respectively, that are to be coupled by coupler 120 in order to perform a coupled simulation and generate a coupled simulation I/O output data structure.

Method 400 may continue by the variable description extractor 210 extracting a first variable description that is associated with a first variable within the first simulation I/O data structure (block 406) and by the variable description extractor 210 extracting a plurality of second variable descriptions that are each associated with a particular variable within the second simulation I/O data structure (block 408). For example, variable description extractor 210 may parse the first and second simulation I/O data structures utilizing components of the natural language processor 202 to extract, expose, single out, or otherwise identify the first and plurality of second variable descriptions, respectively.

Method 400 may continue by the variable linker 220 determining whether the first variable description is equal to, or the same as, any of the plurality of second variable descriptions by conducting a character by character comparison of the first variable description with each of the plurality of second variable descriptions (block 410). As such, if each successive character of the first variable description is equal to a corresponding successive character of a particular second variable description, variable linker 220 determines that the first variable description is equal to the particular second variable description. For example, if the first variable description is "soil type" and the particular second variable description is "soil type", the variable linker 220 would determine that the first variable description is equal to the particular second variable description. Method 400 continues by variable linker 220 linking the first variable to a second variable associated with the particular second variable description in the variable map 230, if the first variable description is equal to the associated second variable description (block 418). For example, variable linker 220 modifies the variable map 230 data structure to indicate that the first variable is linked to the second variable.

Method 400 may continue with natural language processing system 200 determining and ranking character strings within information corpus 330 based upon the character strings relationship(s) to the first variable description (block 412). For example, the system 200 may tokenize the first variable description and determine the part(s) of speech of the word(s) of the first variable description. The system 200 may further conduct an analysis of the first variable description against the character strings within corpus 330 to determine semantic and syntactic relationships between the first variable description and the character strings. The character strings that have the closest semantic and syntactic relationships with the first variable description may be ranked by the degree of relationship closeness or similarity to the first variable description. Such degree of relationship closeness or similarity may be referred to as a confidence level. For example, the system 200 may associate a high confidence level to a character string if there are highly similar semantic and syntactic relationships between the character string and the first variable description.

Method 400 may continue with the natural language processing system 200 comparing the ranked character strings against the plurality of second variable descriptions (block 414). For example, a character by character comparison between the plurality of second variable descriptions and the ranked character strings may be conducted to determine if any of the ranked character strings are equal to, or the same as, a particular second variable description. If there is a ranked character string that is equal to the particular second variable description, the equal character string may be identified as the most similar ranked character string to the second variable description.

Method 400 may continue by determining whether the ranking of a character string that is equal to any one of the plurality of second variable descriptions is above a predetermined threshold (block 416). The threshold is generally associated with how the character strings are ranked. As such, if the character strings are ranked by confidence level indicating the confidence or similarity between the associated character string and the first variable description, the threshold would be a confidence level threshold. For example, it may be determined that two of the plurality of second variables are equal to two different ranked character strings. In this situation, the ranking of the higher ranked (i.e. more similar) character string may be compared against the threshold.

If the ranking of the equal character string has a ranking which falls below the threshold (i.e. it is not similar enough), method 400 ends. In some embodiments, an indication that the first variable was not linked to any variable within the second simulation I/O data structure may be given to a user so that the user may manually link the first variable and an appropriate variable within the second simulation I/O data structure.

If the equal character string has a ranking above the threshold, method 400 may continue by variable linker 220 linking the first variable to the second variable that is associated with the particular second variable description in the variable map 230 (block 418). For example, variable linker 220 modifies the variable map 230 data structure to indicate that the first variable is linked to the second variable. In certain embodiments, an indication may be given to a user (e.g. via I/O device 28A, or the like) that the first variable has been linked to the second variable.

Method 400 may be iteratively practiced to map numerous particular variables within the first simulation I/O data structure to numerous particular variables within the second simulation I/O data structure, respectively. For example, once the first variable in the first simulation I/O data structure is mapped to a second variable in the second simulation I/O data structure, method 400 may be again practiced to map a third variable in the first simulation I/O data structure to a fourth variable in the second simulation I/O data structure.

Figure 8:
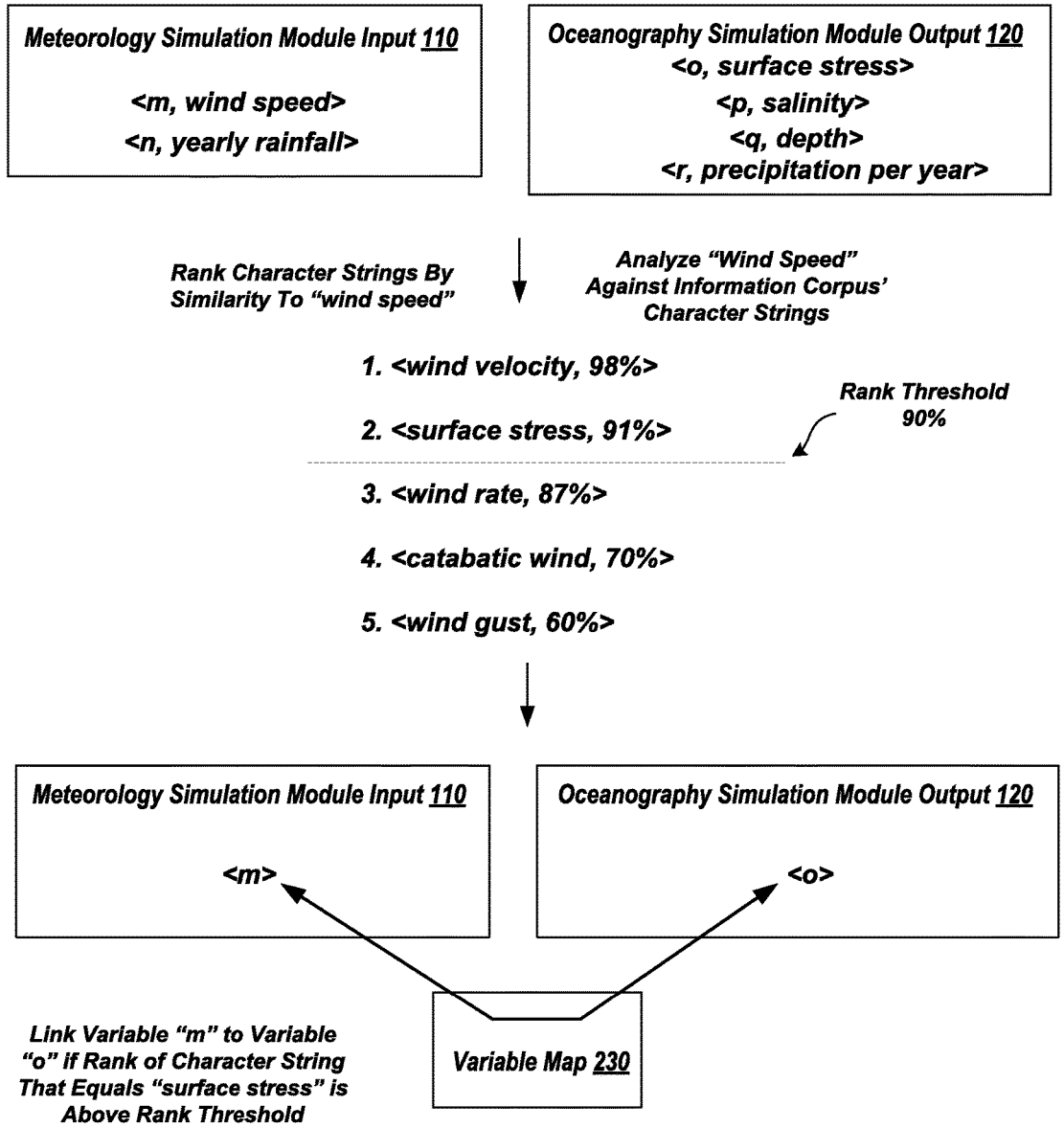
FIG. 8 illustrates an exemplary scheme of linking a variable from a first simulation I/O data structure to a variable from a second simulation I/O data structure, according to various embodiments of the present invention.

FIG. 8 illustrates an exemplary scheme of linking a variable from a meteorology simulation input 110 data structure to a variable from an oceanography simulation output 120 data structure, according to various embodiments of the present invention. Such scheme may begin by simulation I/O reader 204 reading the meteorology simulation input 110 data structure and reading the oceanography simulation output 120 data structure.

The exemplary scheme continues by the variable description extractor 210 extracting the variable description "wind speed" that is associated with variable "m" and extracting the variable description "yearly rainfall" that is associated with variable "n" within the meteorology simulation input 110 data structure. The variable description extractor 210 also extracts the variable description "surface stress" that is associated with variable "n", the variable description "salinity" that is associated with variable "p", the variable description "depth" that is associated with variable "q", and the variable description "precipitation per year" that is associated with variable "r" within the oceanography simulation output 120 data structure.

The scheme continues with a first iteration of the natural language processing system 200 determining and ranking character strings within information corpus 330 based upon the character strings relationship(s) to the variable description "wind speed". In a subsequent iteration, the natural language processing system 200 may determine and rank character strings within information corpus 330 based upon the character strings relationship(s) to the variable description "yearly rainfall".

For example, in the first iteration, the system 200 may tokenize "wind speed" and determine the part(s) of speech of the word(s) of "wind speed." The system 200 may further conduct an analysis of "wind speed" against character strings within corpus 330 to determine semantic and syntactic relationships between "wind speed" and the character strings. The character strings that have the closest semantic and syntactic relationships with "wind speed" may be ranked by a confidence level indicating the confidence in the degree of relationship closeness or similarity of each character string to "wind speed."

In the first iteration, based on the analysis of the character strings against "wind speed", various character strings are ranked by confidence level. Specifically, the word/phrase "wind velocity" is ranked as the most similar to "wind speed" and is associated with a confidence level of 98%, the word/phrase "surface stress" is ranked as the next most similar to "wind speed" and is associated with a confidence level of 91%, the word/phrase "wind rate" is ranked as the next most similar to "wind speed" and is associated with a confidence level of 87%, the word/phrase "catabatic wind" is ranked as the next most similar to "wind speed" and is associated with a confidence level of 70%, and the word/phrase "wind gust" is ranked as the next most similar to "wind speed" and is associated with a confidence level of 60%.

In the first iteration, the scheme continues with the natural language processing system 200 determining whether any of the variables in the oceanography simulation module output 120 data structure are equal to any of the ranked character strings. Here, a character by character comparison between each of the variables in the oceanography simulation module output 120 data structure and one or more of the ranked character strings results in determining that the second ranked character string "surface stress" is equal to the variable description "surface stress" associated with the variable "o".

The scheme continues by determining that the ranking of the equal similar character string is above a predetermined confidence level threshold of 90%. As such, in the present scheme, appropriate variables are linked only when there is a 90% or higher confidence level that the character string that is equal to the variable description "surface stress" is related to the variable description "wind speed."

The scheme continues by variable linker 220 linking variable "m" to variable "o" in the variable map 230 because the most similar character string has a confidence level of 91% which is above the threshold confidence level of 90%. In a second iteration, similar methodologies may be utilized to link variable "n" with variable "r".

Subsequently, a connected simulation may be conducted by simulation engine 30 writing a value associated with variable "n" in the oceanography simulation output 120 data structure as the value of variable "m" within the meteorology simulation input 110 data structure and writing a value associated with variable "r" in the oceanography simulation output 120 data structure as the value of variable "n" within the meteorology simulation input 110 data structure and evoking the meteorology simulation utilizing this augmented meteorology simulation input 110 data structure as the input.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a model, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method linking variables within disparate simulation models, the method comprising:
    extracting, with a distributed processor, a first variable description associated with a first variable within a simulation input data structure comprising input data that is to be read and operated upon by a first simulation model;
    extracting, with the distributed processor, a plurality of variable descriptions within an output data structure comprising output data that has been operated upon and written by a second simulation model;
    determining, with the distributed processor, character strings within an information corpus that are similar to the first variable description;
    ranking, with the distributed processor, the character strings in order of confidence levels, wherein each confidence level indicates a degree of similarity between an associated character string and the first variable description;
    determining, with the distributed processor, a particular variable description of the plurality of variable descriptions within the output data structure is equal to a character string, wherein the particular variable description is associated with a second variable; and
    linking, with the distributed processor, the first variable to the second variable if the rank of the equal character string is greater than a confidence level threshold.

2. The method of claim 1, wherein the distributed processor comprises a first processor within a first computer and a second processor within a second computer.

3. The method of claim 2, wherein the first computer is communicatively connected to the second computer by a network.

4. The method of claim 1, wherein determining character strings within the information corpus that are similar to the first variable description comprises:
    determining, with a natural language processor, syntactic and semantic similarities between the character strings and the first variable description.

5. The method of claim 1, wherein the equal character string is determined by a character by character comparison of ranked character strings above the confidence level threshold and each of the plurality of variable descriptions within the output data structure.

6. The method of claim 1, further comprising:
    prompting that the first variable is not linked to any variable associated with the plurality of variable descriptions within the output data structure if none of the plurality of variable descriptions within the output data structure equal any of the ranked character strings.

7. The method of claim 1, further comprising:
    if the first variable is linked to the second variable, augmenting the input data structure by writing, with the distributed processor, a value of the second variable within the output data structure as a value of the first variable within the input data structure.

8. A computer program product for linking variables within disparate simulation models, the computer program product comprising a distributed computer readable storage medium having program instructions embodied therewith, the program instructions are readable by a distributed processor to cause the distributed processor to:
    extract a first variable description associated with a first variable within a simulation input data structure comprising input data that is to be read and operated upon by a first simulation model;
    extract a plurality of variable descriptions within a simulation output data structure comprising output data that was operated upon and written by a second simulation model;
    determine character strings within an information corpus that are similar to the first variable description;
    rank the character strings in order of confidence levels, wherein each confidence level indicates a degree of similarity between an associated character string and the first variable description;
    determine a particular variable description of the plurality of variable descriptions within the simulation output data structure is equal to a character string, wherein the particular variable description is associated with a second variable; and
    link the first variable to the second variable if the rank of the equal character string is greater than a confidence level threshold.

9. The computer program product of claim 1, wherein the distributed processor comprises a first processor within a first computer and a second processor within a second computer.

10. The computer program product of claim 9, wherein the first computer is communicatively connected to the second computer by a network.

11. The computer program product of claim 8, wherein the program instructions that cause the distributed processor to determine character strings within the information corpus that are similar to the first variable description further cause a natural language processor to determine syntactic and semantic similarities between the character strings and the first variable description.

12. The computer program product of claim 8, wherein the equal character string is determined by a character by character comparison of ranked character strings above the confidence level threshold and each of the plurality of variable descriptions within the simulation output data structure.

13. The computer program product of claim 8, wherein the program instructions are readable by the distributed processor to:
    prompt that the first variable is not linked to any variable associated with the plurality of variable descriptions within the simulation output data structure if none of the plurality of variable descriptions within the simulation output data structure equal any of the ranked character strings.

14. The computer program product of claim 8, wherein the program instructions further cause the distributed processor to augment the simulation input data structure by writing a value of the second variable within the simulation output data structure as a value of the first variable within a first I/O data structure, if the first variable is linked to the second variable.

15. A distributed computer system comprising:
a distributed processor; and
a distributed memory communicatively coupled to the distributed processor, wherein the distributed memory is encoded with instructions, wherein the instructions when executed by the distributed processor cause the distributed processor to:
  extract a first variable description associated with a first variable within a simulation input data structure comprising input data that is to be read and operated upon by a first simulation model;
  extract a plurality of variable descriptions within a simulation output data structure comprising output data that was operated upon and written by a second simulation model;
  determine character strings within an information corpus that are similar to the first variable description;
  rank the character strings in order of confidence levels, wherein each confidence level indicates a degree of similarity between an associated character string and the first variable description;
  determine a particular variable description of the plurality of variable descriptions within the simulation output data structure is equal to a character string, wherein the particular variable description is associated with a second variable; and
  link the first variable to the second variable if the rank of the equal character string is greater than a confidence level threshold.

16. The distributed computer system of claim 15, wherein the distributed processor comprises a first processor within a first computer and a second processor within a second computer.

17. The distributed computer system of claim 16, wherein the first computer is communicatively connected to the second computer by a network.

18. The distributed computer system of claim 15, wherein the program instructions that cause the distributed processor to determine character strings within the information corpus that are similar to the first variable description further cause a natural language processor to determine syntactic and semantic similarities between the character strings and the first variable description.

19. The distributed computer system of claim 15, wherein the equal character string is determined by a character by character comparison of ranked character strings above the confidence level threshold and each of the plurality of variable descriptions within the simulation output data structure.

20. The distributed computer system of claim 15, wherein the program instructions further cause the distributed processor augment the simulation input data structure by writing a value of the second variable within the simulation output data structure as a value of the first variable within the simulation input data structure, if the first variable is linked to the second variable.

* * * * *